United States Patent [19]

Beissbarth

[11] 4,394,798
[45] Jul. 26, 1983

[54] WHEEL ALIGNMENT MEASURING APPARATUS

[76] Inventor: Osmond Beissbarth, Sulzbacher Str. 15, 8000 München 40, Fed. Rep. of Germany

[21] Appl. No.: 265,126

[22] Filed: May 19, 1981

[30] Foreign Application Priority Data

Jun. 12, 1980 [DE] Fed. Rep. of Germany ....... 3022073

[51] Int. Cl.$^3$ ............................................. G01B 7/315
[52] U.S. Cl. ................................... 33/335; 33/203.14; 33/203.18
[58] Field of Search ........... 33/203.12, 203.14, 203.18, 33/203.19, 335, 336, 337

[56] References Cited

U.S. PATENT DOCUMENTS

| 2,765,540 | 10/1956 | MacMillan et al. | 33/336 |
| 2,831,264 | 4/1958 | Weaver | 33/337 |
| 2,953,857 | 9/1960 | Mineck | 33/203.12 |
| 3,409,991 | 11/1968 | Davis et al. | 33/335 |
| 3,423,839 | 1/1969 | Liskey | 33/336 |
| 3,758,958 | 9/1973 | Jordan | 33/336 |
| 4,138,825 | 2/1979 | Pelta | 33/336 |

FOREIGN PATENT DOCUMENTS

| 2356122 | 1/1978 | France | 33/203.18 |
| 2455267 | 11/1980 | France | 33/335 |

Primary Examiner—Richard R. Stearns
Attorney, Agent, or Firm—Beveridge, DeGrandi and Kline

[57] ABSTRACT

A wheel alignment measuring apparatus of the invention has angle measuring instruments joined up with the input of an electronic signal processing unit. A first and a second angle measuring instrument (1, 2) are placed on a nearside and on an offside front wheel support turntable respectively for sending in each case a signal representative of the steering angle of the front wheels to the signal processing unit. The processing unit calculates therefrom the steering difference angle. A third and a fourth and furthermore a fifth and a sixth angle measuring instrument are so placed in the one case on the nearside and in the other case on the offside front wheel that by way of the signal processing unit on the footing of changes in the output signals of the first and the third and on the other hand of the second and fourth angle measuring instruments the caster of the nearside and of the offside front wheels may be calculated. On the basis of the changes of the output signals of the first and fifth and on the other hand of the second and sixth angle measuring instruments, the king pin angles of the nearside and of the offside front wheels may be calculated. By the apparatus of the invention readings may, therefore, be produced for the steering difference angle, the caster and the king pin angles in only one measuring operation.

19 Claims, 5 Drawing Figures

WHEEL ALIGNMENT MEASURING APPARATUS

BACKGROUND OF THE INVENTION

The present invention relates to a wheel alignment measuring apparatus with six angle measuring instruments whose outputs are joined up with an electronic signal processing unit.

In the prior art, wheel alignment measuring apparatus has been made with freely moving turntables which are placed under the steering wheels of a vehicle and which has a number of different measuring instruments to be fixed to the steering wheels and giving readings for toe-in and camber and furthermore for giving a reading for the tracking difference angle, that is to say the angle of the steering wheel which may be though of as being on the inside on turning a corner, at a steering angle of −20° of such wheel, for the caster (that is to say the slope of the king pin or the axis of turning of the wheel as seen from the side of the vehicle), and the king pin angle, that is to say the slope of the king pin in a plane normal to the length direction of the vehicle to an upright.

On changing the steering angle of the front wheels the slope of the wheel plane, that is to say the camber, is changed while at the same time the slope of the unmoving wheel is changed. On the basis of these changes between two equal angles of steering, that is to say equally far from the straight ahead position, readings are produced for the caster and the king pin angle. For this reason the angles of steering have to be able to be extactly measured.

For producing a reading for these steering angles of the front steering wheels, such wheels are placed on turntables whose top turning parts have scales which cooperate with pointers fixed to the fixed lower parts of the turntables. For each measuring operation the scale has to be moved separately for each side of the vehicle in relation to the pointer, which may have a vernier, till a zero reading is produced. After this working step, the wheel has to be turned into the desired steering angle position, it being necessary for the worker to undertake these steps directly on each wheel on each side separately, the use of the steering wheel not being possible because it is then not possible to see any reading for the steering angle.

Quite separately from the steering motions of the front wheels, it is furthermore necessary to make adjustment and to take readings at different further angle measuring units, and it is only after changing over the steering angle of the front wheels to the other direction that complete and true figures for the wheel alignment angles are produced.

Taking readings for the track difference angle, caster and toe-in has to be done separately, first on the one side and then on the other. It may well be that up to twenty working steps will be necessary for measuring wheel alignment if the worker has to go from one side of the vehicle to the other six to eight times.

GENERAL OUTLINE OF THE INVENTION

One purpose of the present invention is that of making an improved wheel alignment measuring apparatus wherein readings for the tracking difference angle, caster and king pin angle may be undertaken in one single measuring operation.

For effecting this purpose a wheel alignment measuring apparatus according to the invention comprises a first and a second angle measuring instrument which are placed on a nearside and on an offside front wheel support turntable, respectively, for sending in each case a signal representative of the steering angle of the front wheels to the signal processing unit, the processing unit calculating therefrom the steering difference angle, a third and a fourth and furthermore a fifth and a sixth angle measuring instrument are so placed in the one case on the nearside and in the other case on the offside front wheel that by way of the signal processing unit on the basis of changes in the output signals of the first and the third and on the other hand of the second and fourth angle measuring instruments the caster of the nearside and of the offside front wheels may be calculated and on the basis of the changes of the output signals of the first and fifth and on the other hand of the second and sixth angle measuring instruments the king pin angles of the nearside and of the offside front wheels may be calculated so that, in one measuring operation, readings may be produced for the steering difference angle, the caster and the king pin angles.

The wheel alignment measuring apparatus of the present invention may be said to be a marked step forward from prior art systems in use so far, its main useful effect being that very much less time is needed for measuring, because with a single steering motion produced by the steering wheel of the vehicle, readings may be taken for the steering difference angle, the caster and the king pin angle without it being necessary for the user to get up from his seat at the steering wheel with the instrument board for the readings of the apparatus next to him. A further useful effect is that the new wheel alignment measuring apparatus generally puts an end to errors in operation and errors in calculation of the readings.

Because in the case of a preferred working example of the wheel alignment measuring apparatus of the present invention has two pointers and an indicator which are placed on a control panel, operation of the apparatus is generally very straightforward. A short outline will now be given of the design and function of one preferred working example of my new wheel alignment measuring apparatus. Two angle measuring instruments are present in the support turntables, the output voltages of these instruments changing on moving the steering wheels out of the straight ahead position and such changes take effect on the signal processing unit. For producing a reading for the steering difference angle at a steering angle of the wheel thought to be on the inside on cornering, of 20° a measuring point is noted by the apparatus on the basis of the output voltage of the angle measuring instrument in question, this output voltage being opposite to the output voltage of the second angle measuring instrument, which is dependent on the steering motion of the wheel thought as of being on the outside on cornering. The zero value in respect of the output values or output voltages of the two angle measuring units is calculated in the signal processing unit.

Four further angle measuring units which have plumb line systems or other measuring parts for sensing the vertical, are placed in the two measuring systems which in a known way are fixed to the front wheels and which furthermore have measuring units for measuring the toe-in. Two of the further angle measuring units are so placed that the direction of motion of their plumb line systems is normal to the length direction of the vehicle, these angle measuring instruments for angle pick-ups being used for measuring camber. The two other further angle measuring instruments are so placed that their plumb line systems may be moved in a plane which is at 90° to the planes of the camber angle pick-ups so that the direction of motion of the plumb line systems of the last-named angle measuring instruments is parallel to the length direction of the vehicle. The output voltages of the four further angle measuring instruments undergo changes, on moving the front wheels out of the straight ahead position, because of a change in the position of the king pin. These output signals are then processed together in the processing unit with other changing output signals or output voltages coming from the angle measuring units in the support turntables, such instruments being for example field plate potentiometers. On the basis of the change in the output voltages of the angle pick-ups having the plumb line systems between two given angles of steering of the front wheels the caster and the toe-in are calculated by the processing unit, the angles of steering of the front wheels, that is to say out of the straight ahead positions, being able to be measured by the output signals of the first-noted angle pick-ups (potentiometers of the turntable). The values for readings so calculated are then stored so that they may be later presented in a readout.

In the front panel or the like of the apparatus there are furthermore other elements in addition to switches as used in prior art systems and in addition to two angle readouts. These further parts take the form of a main switch for undertaking the three common measuring operations together, that is to say steering difference angle, caster and king pin angle. Furthermore there are two pointers and arrows making it clear to the worker in which direction the steering system has to be turned, such pointers being controlled by a logical circuit which is part of the signal processing unit. There is furthermore an indicator lamp, which as well is under the control of the logical circuit and which makes it clear, when lighted up, that all measuring steps have been undertaken. Lastly it is possible to have a three stage switch for causing readout of the values or output values stored in the signal processing unit.

LIST OF FIGURES

DETAILED ACCOUNT OF WORKING EXAMPLE OF MY INVENTION

Figure 1:
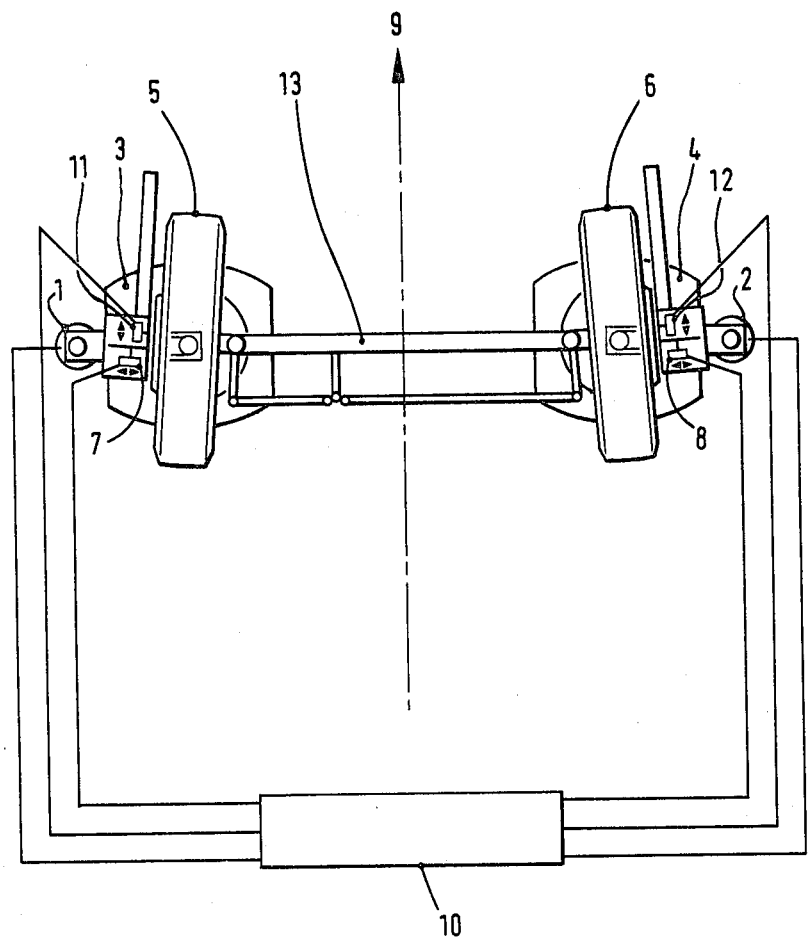
FIG. 1 is a diagrammatic plan view looking down on the wheels of the front axle of a vehicle with the wheel alignment measuring apparatus of the present invention.
Figure 3:
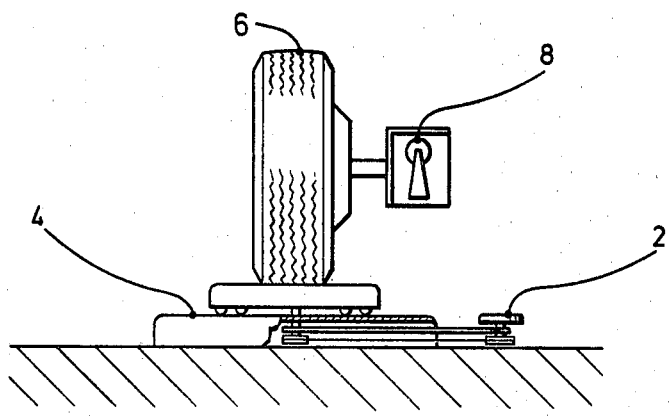
FIG. 3 is a view from the back looking toward the offside wheel and the parts joined therewith.
Figure 4:
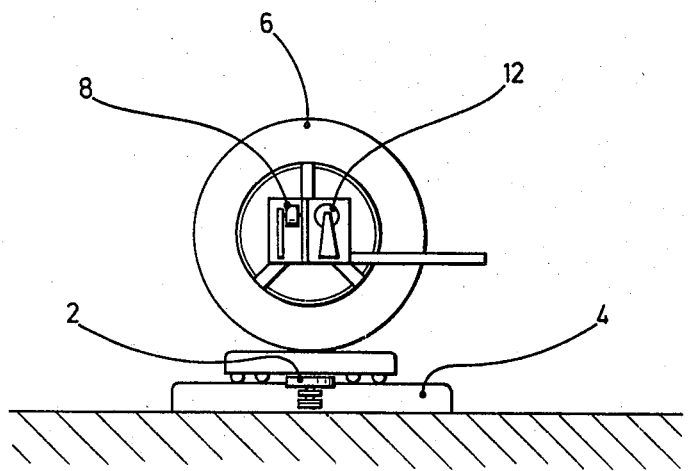
FIG. 4 is a side view of the front wheel to be seen in FIG. 3 and the parts joined therewith.

Looking now more specially at FIGS. 1, 3 and 4, the reader will see two front wheels 5 and 6 together with the front axle 13 of a motor vehicle, wheels 5 and 6 being supported on separate turntables 3 and 4 each having an angle measuring instrument or angle pick-up 1 and 2 which take the form of field plate potentiometers which are electromagnetic instruments in which a field plate is moveable with respect to a magnetic means to change the magnetic flux. The changes of the magnetic flux are processed to obtain output signals. One example of such an instrument is sold by Siemens AG under specification number FP 310L 100/30°. Using known fixing parts (see in this respect my earlier U.S. patent application Ser. No. 180,240 as well), angle measuring instruments or angle pick-ups 7, 8, 11 and 12 having plumb line systems are fixed to the front wheels 5 and 6. The plane of motion of the plumb line system of angle pick-up 7 and 8 is normal to the length direction 9 of the vehicle, this being marked by arrows over angle pick-ups 7 and 8. On the other hand, the plane of motion of the plumb line system of the angle pick-up 11 and 12 is parallel to the length direction 9 of the vehicle, this being marked by arrows as well. The direction of the plumb line systems may furthermore be seen from FIGS. 3 and 4. The plane of the plumb line system of pick-up 8 is parallel to the plane of FIG. 3 and normal to that of FIG. 4. The plumb line system of the angle pick-up 12 is parallel to the plane of FIG. 4.

Figure 2A:
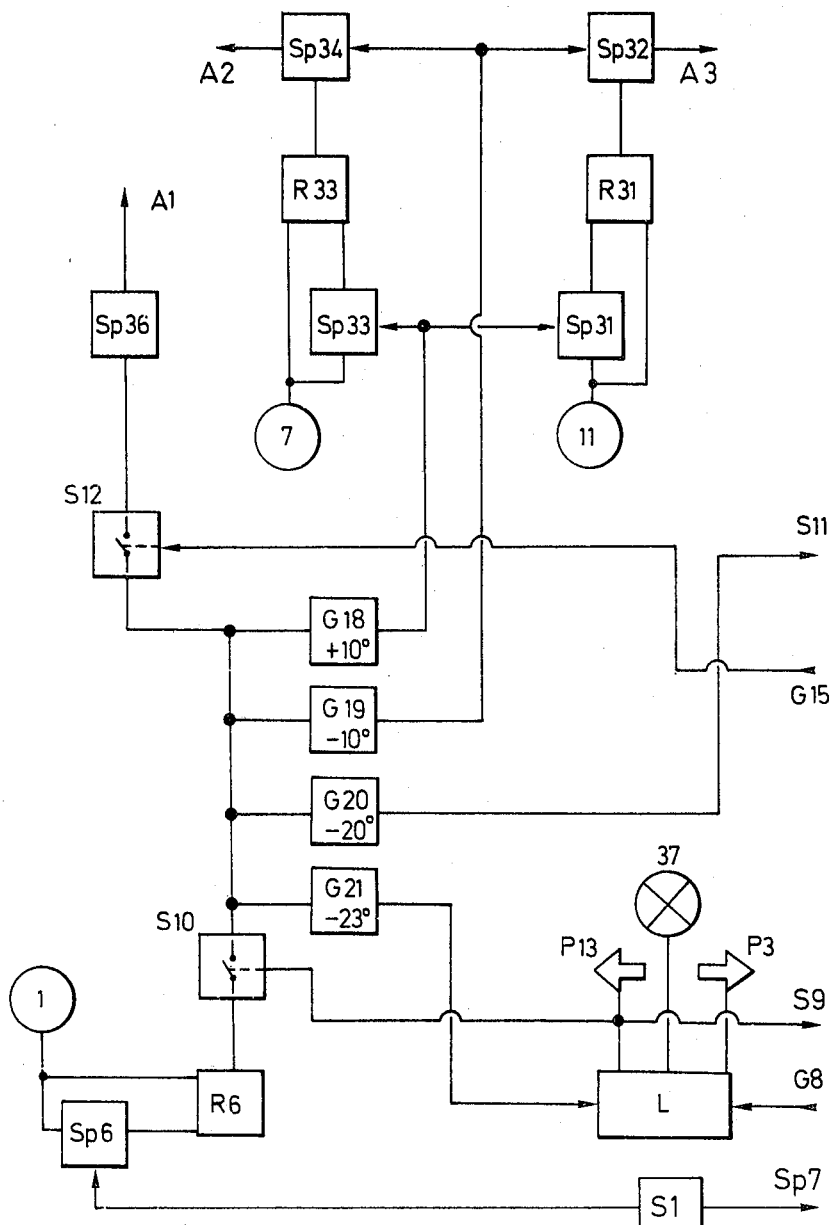
FIGS. 2a and 2b are a block schematic of the processing unit to be seen in FIG. 1.
Figure 2B:
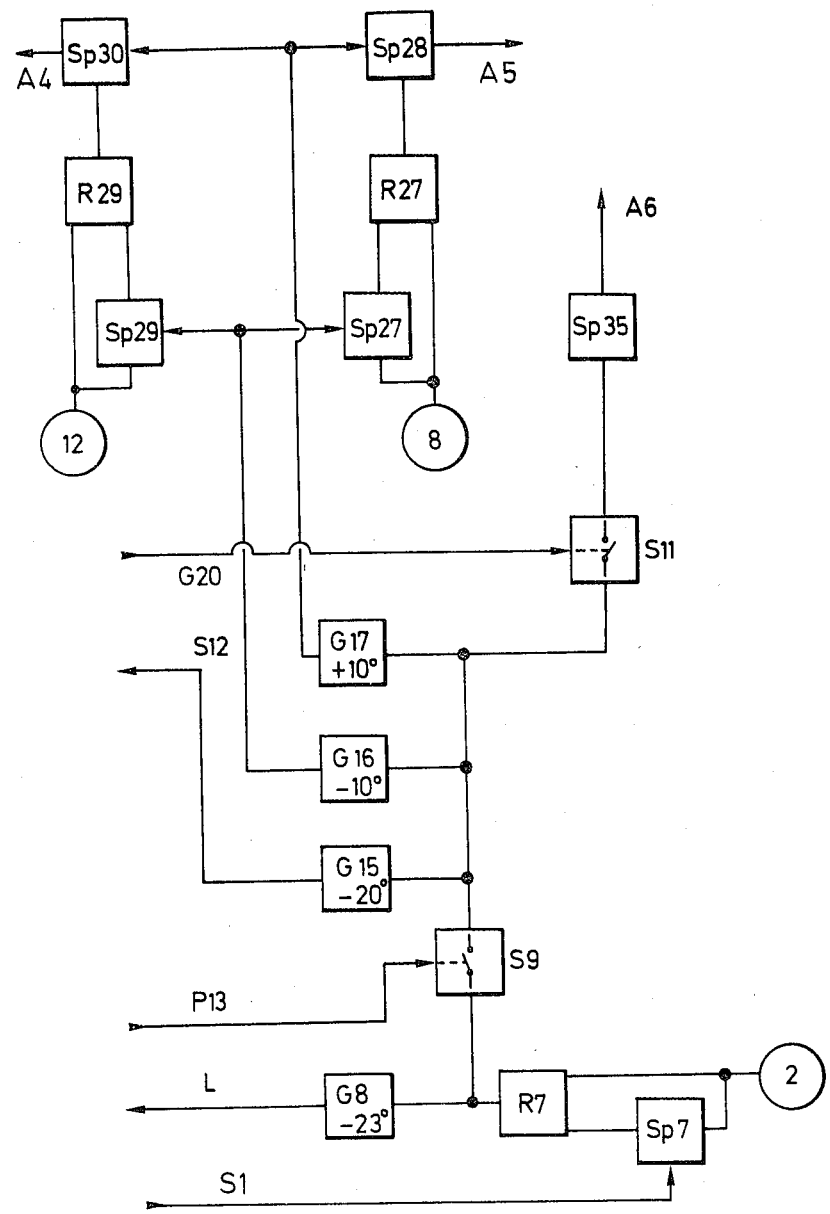

Angle pick-ups 1, 2, 7, 8, 11 and 12 are in each case joined up by wiring with an electronic signal processing unit 10, of which details will be seen in FIGS. 2a and 2b, details of the connections of the wiring being given by lettering in these figures.

In FIG. 2 the reader will furthermore see a main switch S 1 used on measuring steering angle differences, caster and king pin angles, the output of the switch S 1 being joined up in the one case with a memory Sp 6 and in the other case with a memory Sp 7. Each of the memories Sp 6 and Sp 7 is placed between the angle pick-up 1 and a calculation stage R 6 (which is furthermore directly joined with angle pick-up 1) and in the other case between the angle pick-up 2 and a calculation stage R 7 (which is as well joined directly with angle pick-up 2). Calculation stage R 6 has its output joined with an analog switch S 10. Furthermore the output of calculation stage R 7 is joined up with an analog switch S 9 and a switching gate G 8 for minus 23°. Switching gates G 18 (for +10°), G 19 (for −10°), G 20 (for −20°) and G 21 (for −23°) and an analog switch S 12 are joined up with the output of the analog switch S 12. Between the switching gates G 21 and G 8 there is a logical circuit L for driving the marking or indicator arrows P 3 and P 13 and a green lamp 37. Furthermore between the analog switches S 9 and S 10 there is a connection, which is joined up with the connections of the logical circuit L, the marking arrows P 3 and P 13 and the green lamp 37. The output of analog switch S 9 is, on the same lines as is the case with analog switch S 10, joined up with switching gates G 15 (for −20°), G 16 (for −10°) and G 17 (for +10°) and an analog switch S 11, which is furthermore joined up with the switching gate G 20. The output of switching gate G 16 is joined up with two memories Sp 27 and Sp 29 and furthermore the switching gate G 17 has its output joined up with two memories Sp 28 and Sp 30. Furthermore switching gate G 18 has its output joined up with two memories Sp 31 and Sp 33. Lastly, the output of switching gate G 19 is joined up with two memories Sp 32 and Sp 34. Between the memory Sp 27 and memory Sp 28 there is a calculation stage R 27, joined up directly with angle pick-up 8. On the same lines between the memory Sp 30 and the memory Sp 29 there is a calculation stage which as well is joined up directly with the angle pick-up 12. A calculation stage R 31 joined up between the memory Sp 31 and the memory Sp 32 is directly joined up with angle pick-up 11. Furthermore between memory 33 and memory 34 there is a calculation stage R 33, which is joined up directly with the angle pick-up 7. The output of analog switch S 11 and in the other case S 12 are joined up with a memory Sp 35 and Sp 36 in the other case as well. Memories Sp 36, Sp 34, Sp 32, Sp 30, Sp 28 and Sp 35 are, lastly, joined up with the outputs A 1 to A 6.

An account will now be given of operation of the circuit to be seen in FIGS. 2a and 2b, it being taken to be the case that at the start the wheels are in the "straight ahead" position.

Firstly main switch S 1 is put in the position for measuring steering difference angle, caster and king pin angle. When this is being done, arrows P 3 and P 13 are such that the arrow P 3 pointing to the offside is turned on, that is to say lighted up. Furthermore memories Sp 6 and Sp 7 are put into such a condition that calculation stages R 6 and R 7 each have an output voltage of zero volts.

Then the steering wheel is turned in the offside direction, as marked by arrow 3, by the user of the apparatus.

On doing this, the output voltages of angle pick-ups 1 and 2 are so changed that the voltage from angle pick-up 2 becomes negative and that from angle pick-up 1 becomes positive. Memories Sp 6 and Sp 7 keep to the same values so that the change in the output voltage of the calculation stage R 6 and in the other case R 7 is analogous to the change in the field plate potentiometer voltage.

If now the voltage coming from the angle pick-up 2 gets to a value representative of a steering angle of −23°, logical circuit L is switched by switching gate G 5 (−23°) so that angle P 3 is turned off and arrow P 13 turned on, that is to say is lighted up. Operation of the analog switches S 9 and S 10 takes place together with operation of arrow P 13.

These analog switches S 9 and S 10 now make the output voltge of angle pick-ups 1 and 2 go to all switching gates G 15–G 21, coming later in the circuit, and analog switches S 11 and S 12.

The steering wheel is then turned by the user in the direction marked by arrow P 13.

The output voltage of angle pick-up 2 is for this reason increased and that coming from angle pick-up 1 becomes smaller.

If now the voltage coming from angle pick-up 2 gets to a value representative of a steering angle of −20°, the analog switch S 12 is turned on by switching gate G 15 (−20°) and the voltage value, present at this point in time, of the angle pick-up 1 in inputted to memory Sp 36.

On the voltage of pick-up 2 then getting to a value representative of an angle of −10°, memories Sp 27 and Sp 29 are switched on by switching gate G 16 so that the memories now get the output voltage values of angle pick-ups 11 and 12. Then there is no further change in the values of these memories.

Angle pick-up 1 then goes to a value representative of an angle of +10°, memories Sp 31 and Sp 33 then being turned on by switching gate G 18 (+10°) for inputting these values, coming from angle pick-ups 11 and 7 into the memories. In the case of memories Sp 31 and Sp 33 as well there is no further change.

The voltage of angle pick-up 1 then takes on a value representative of an angle of −10° and memories Sp 32 and Sp 34 are turned on by switching gate G 19 (−10°) so that the output voltages of calculation stages R 31 and R 33 are inputted into the memories. This voltage is in this respect the difference between the voltage of memory Sp 31 or in the other case Sp 33 and the voltage of angle pick-up 11, or in the other case 7.

Angle pick-up 2 then goes to a voltage representative of a steering angle of +10° and switching gate G 17 (+10°) gives the command for input of the output voltages of calculation stages R 27 and R 29 to memories Sp 28 and Sp 30, this voltage being the difference between the voltage of memory Sp 27 (or Sp 29 in the other case) and the voltage of angle pick-up 8 (or in the other case 12).

The output voltage of angle pick-up 1 then goes to a level representative of an angle of −20°, operation of analog switch S 11 being caused by switching gate G 20. Memory Sp 35 gets the level present at the angle pick-up 2 at this time.

When the voltage of angle pick-up 1 gets to a level representative of an angle of −23°, switching gate G 21 (−23°) is switched and the logical circuit L is so switched round that arrow P 13 goes out and the green lamp 37 is lighted up making it clear that the measuring operation has run to an end.

The readings are now on hand at outputs A 1 to A 6 and may be outputted when needed from the memories in question. More specially, further turning of the steering wheel does not have any effect on the values stored in the memories.

The angle stored in memory Sp 35 is the angle into which the offside front wheel is turned, when the nearside front wheel has a steering angle of −20°. This reading is on hand at output A 6.

In memory Sp 36 that angle is stored which is taken up by the nearside front wheel when the offside front wheel is at a steering angle of −20°. This reading is on hand at output A 1. It is furthermore possible for a calculation circuit to have its input joined with the outputs of memories Sp 35 and Sp 36 so that it is not the absolute values but the difference between the readings for the steering angles of the nearside or the offside front wheels which are stored in the memories.

In memory Sp 28 the caster of the offside front wheel is stored, that is to say the change in the output reading of pick-up 8 on changing the steering angle of the offside front wheel from −10° to +10°, this caster reading being on hand at output A 5.

In memory Sp 30 the king pin angle for the offside front wheel is stored, that is to say the change in the output of angle pick-up 12 on changing the steering angle of the off-side front wheel from −10° to +10°, this king pin angle reading being on hand at output A 4.

Furthermore in memory Sp 34 the caster of the nearside front wheel, that is to say the change in the output reading of angle pick-up 7 on changing of from the steering angle of +10° to −10°. The caster reading is on hand at and may be taken from output A 2.

Lastly the king pin angle of the nearside front wheel is stored in memory Sp 32, that is to say the reading stored is for the change in the output from the angle pick-up 11 on changing the storing angle of the nearside front wheel from +10° to −10°. This king pin angle reading may be taken from output A 3.

The outputs A 1 to A 6 may be joined up with the readout part of a viewing apparatus, or two viewing apparatusses, which is or are best placed near the arrows P 3 and P 13 and the green lamp 37. Lastly a three stage switch may be used for reading out the stored values at the outputs of the signal processing unit and for causing readout thereof.

I claim:

1. A wheel alignment measuring apparatus for a vehicle having a nearside front wheel and an offside front wheel, said apparatus being operable to produce, in one operation, readings for the steering difference angle, the caster and the king pin angles, said apparatus comprising, a first angle measuring instrument including means for providing a first output signal representative of the steering angle of the nearside front wheel, a second angle measuring instrument including means for providing a second output signal representative of the steering angle of the offside front wheel, a third angle measuring instrument including means for providing a third output signal representative of the inclination of the nearside front wheel in a plane of motion which is substantially normal to the length direction of the vehicle when the wheels are in a straight ahead position, a fourth angle measuring instrument including means for providing a fourth output signal representative of the inclination of the offside front wheel in a plane of motion which is substantially normal to the length direction of the vehicle when the wheels are in a straight ahead position, a fifth angle measuring instrument including means for providing a fifth output signal representative of the inclination of the nearside front wheel in a plane of motion which is substantially parallel to the length direction of the vehicle when the wheels are in a straight ahead position, a sixth angle measuring instrument including means for providing a sixth output signal representative of the inclination of the offside front wheel in a plane of motion which is substantially parallel to the length direction of the vehicle when the wheels are in a straight ahead position, a signal processing means for receiving said output signals and performing the following functions:

(a) calculating the steering difference angle from the output signals of the first and second angle measuring instruments;

(b) calculating the caster of the nearside front wheel from changes which occur in the output signals of the first and third angle measuring instruments as a result of steering motion of the nearside front wheel;

(c) calculating the caster of the offside front wheel from changes which occur in the output signals of the second and fourth angle measuring instruments as a result of steering motion of the offside front wheel, (d) calculating the king pin angles of the nearside front wheel from changes which occur in the output signals of the first and fifth angle measuring instruments as a result of steering motion of the nearside front wheel;

(e) calculating the king pin angles of the offside front wheel from changes which occur in the output signals of the second and sixth angle measuring instruments as a result of steering motion of the offside front wheel.

2. A measuring apparatus as claimed in claim 1 wherein the third and the fourth angle measuring instruments are operable to provide, when the wheels are in the straight ahead position, readings for the camber of the nearside and of the offside front wheels.

3. A measuring apparatus as claimed in claim 1 wherein the signal processing means has switching gates, which may be switched so as not to be dependent on the output signals of the first and in the other case of the second angle measuring instrument.

4. A measuring apparatus as claimed in claim 1 wherein the output signal of each angle measuring instrument is joined up with a memory, a calculation stage and an analog switch.

5. A measuring apparatus as claimed in claim 4 wherein the outputs of the analog switches are joined up on the one hand with the switching gates and on the other hand with a further analog switch.

6. A measuring apparatus as claimed in claim 5 wherein the further analog switches are furthermore joined up at their outputs in each case with a switching gate.

7. A measuring apparatus as claimed in claim 6 wherein the outputs of the further analog switches are furthermore joined up with a memory.

8. A measuring apparatus as claimed in claim 1 wherein the output signals produced at certain angles of the third, fourth, fifth and sixth angle measuring instruments are stored in a memory joined therewith.

9. A measuring apparatus as claimed in claim 8 wherein the outputs of the third, fourth, fifth and sixth angle measuring instruments and the memories joined therewith are joined in each case with a calculation stage.

10. A measuring apparatus as claimed in claim 9 wherein each calculation stage is joined at its output with a further memory.

11. A measuring apparatus as claimed in claim 10 wherein in each case two of the further memories are joined up with a switching unit.

12. A measuring apparatus as claimed in claim 9 wherein in each case two of the memories are joined up with a switching unit.

13. A measuring apparatus as claimed in claim 12 wherein the switching units in each case joined up with the memories and in the other case with the further memories each have an adjustment to opposite angles ($+10°$, $-10°$).

14. A measuring apparatus as claimed in claim 1 further comprising two arrows and a lamp which in a way dependent on the position of the first and of the second angle measuring instrument may be put into operation by way of a logical circuit.

15. A measuring apparatus as claimed in claim 14 wherein the logical circuit is joined up by way of a switching gate with the output of the calculation stage of the second angle measuring instrument.

16. A measuring apparatus as claimed in claim 15 wherein the logical circuit is joined up with a further switching gate.

17. A measuring apparatus as claimed in claim 16 wherein a memory joined up with the outputs of the first and the second angle measuring instrument is in each case joined up with a main switch.

18. A measuring apparatus as claimed in claim 1 wherein the first and the second angle measuring instruments are field plate potentiometers.

19. A measuring apparatus as claimed in claim 1 wherein the third, fourth, fifth and sixth angle measuring instruments are angle measuring instruments having plumb line systems.

* * * * *